(No Model.) 3 Sheets—Sheet 1.
E. N. GILFILLAN.
WEIGHING SCALE.

No. 579,974. Patented Apr. 6, 1897.

Witnesses
Wm. F. Hamming
Sam. M. Rheem

Inventor
E. N. Gilfillan
by Elliott + Hopkins Attys.

THE NORRIS PETERS CO., PHOTO-LITHO., WASHINGTON, D. C.

(No Model.) 3 Sheets—Sheet 2.
E. N. GILFILLAN.
WEIGHING SCALE.
No. 579,974. Patented Apr. 6, 1897.
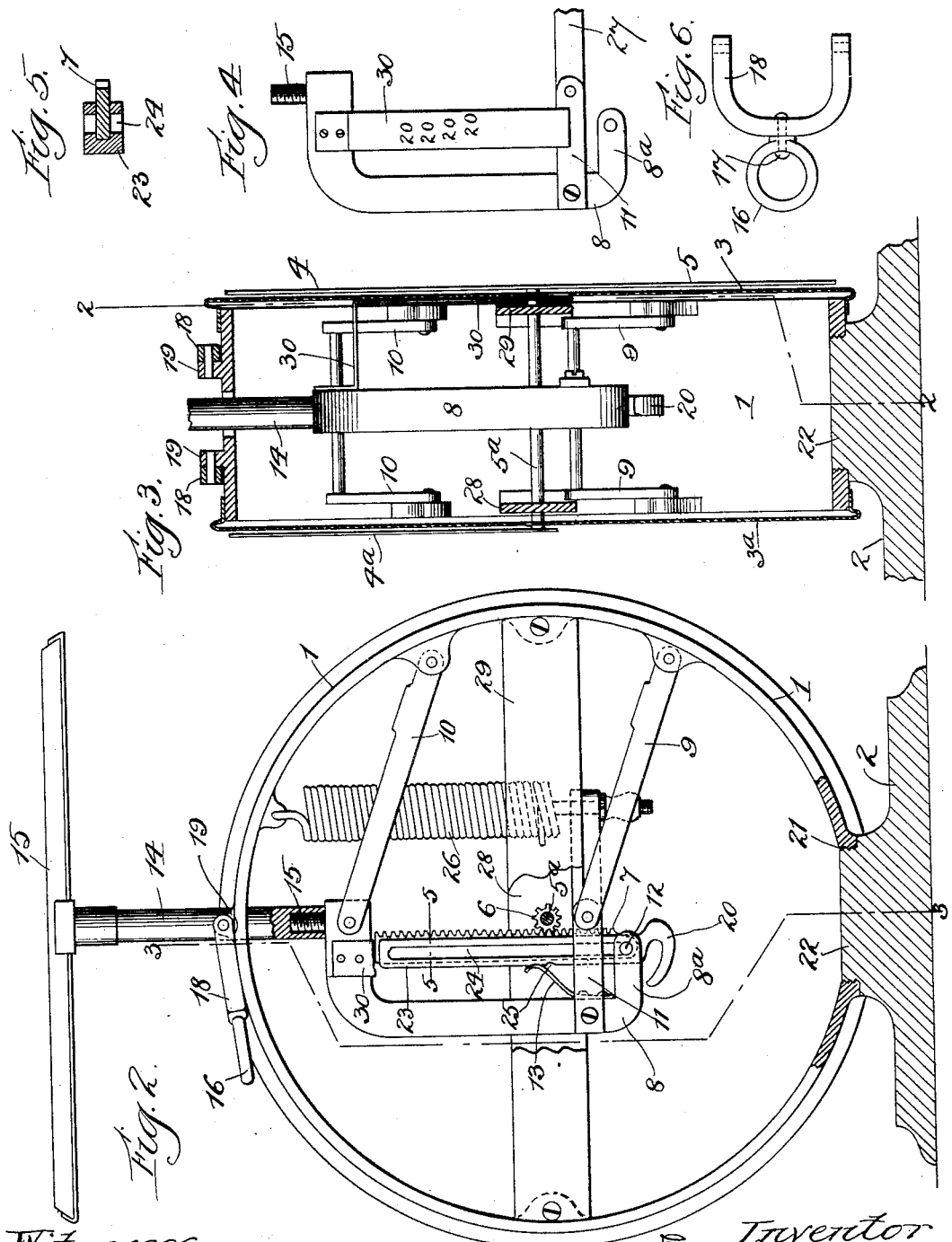
Witnesses
Wm. F. Henning
Wm. N. Rheem
Inventor
E. N. Gilfillan
by Elliott & Hopkins
Attys.

(No Model.)  3 Sheets—Sheet 3.

E. N. GILFILLAN.
WEIGHING SCALE.

No. 579,974.  Patented Apr. 6, 1897.

Witnesses  
Wm. F. Henning  
Wm. N. Rheem

Inventor  
E. N. Gilfillan  
by Elliott Hopkins  
Attys.

THE NORRIS PETERS CO., PHOTO-LITHO., WASHINGTON, D. C.

UNITED STATES PATENT OFFICE.

ESSINGTON N. GILFILLAN, OF CHICAGO, ILLINOIS, ASSIGNOR TO THE CHICAGO COMPUTING SCALE COMPANY, OF SAME PLACE.

WEIGHING-SCALE.

SPECIFICATION forming part of Letters Patent No. 579,974, dated April 6, 1897.

Application filed March 16, 1896. Serial No. 583,354. (No model.)

*To all whom it may concern:*

Be it known that I, ESSINGTON N. GILFILLAN, a citizen of the United States, residing at Chicago, in the county of Cook and State of Illinois, have invented certain new and useful Improvements in Weighing-Scales, of which the following is a full, clear, and exact specification.

My invention relates to that class of scales in which the pointer or index is pivoted at the center of the dial and is actuated to travel around the dial by means of a vertically-moving rack engaging a pinion on the arbor of the pointer or index; and the invention has for one of its objects to provide means whereby the scale may be readily converted into either a swinging scale or a pedestal or counter scale.

Another object of my invention is to provide the dial with improved means whereby the amount of the purchase may be readily and automatically computed; and a still further object of my invention is to provide means whereby the means or device for supporting the substance to be weighed may be supported by pivoted cushioned arms (inasmuch as this manner of supporting said means produces less friction and a more uniform friction than any other known in the art) and to convert this curvilinear movement of the supporting-arms into a rectilinear movement whereby a rack-bar may be employed for rotating the index and such rack-bar in operating upon the arbor of the index will travel in a straight line, whereby the rack-bar will at no time throughout the stroke of the arms have a tendency to "walk around" the arbor of the index without rotating such arbor.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

Figure 1:
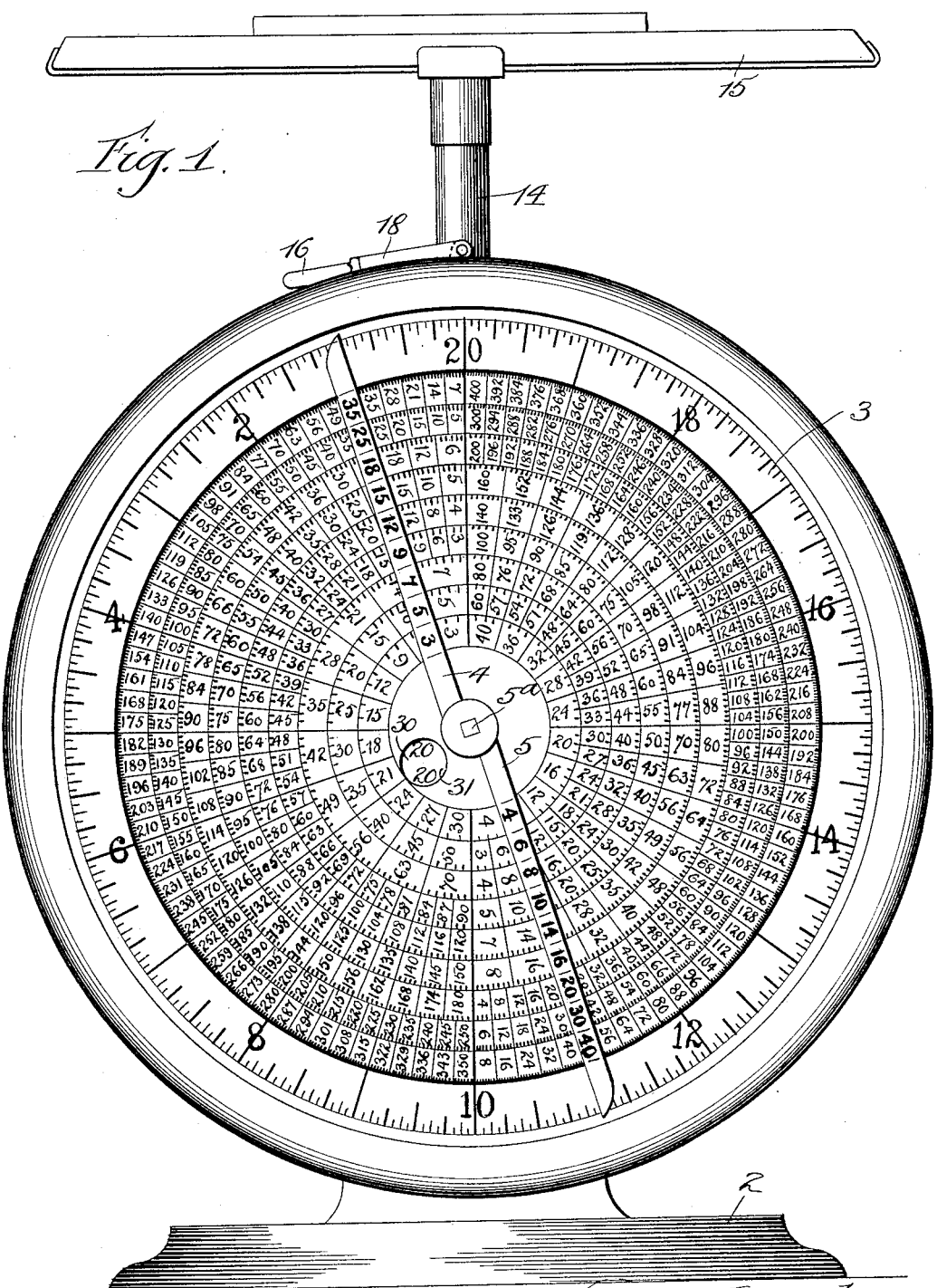
Figure 7:
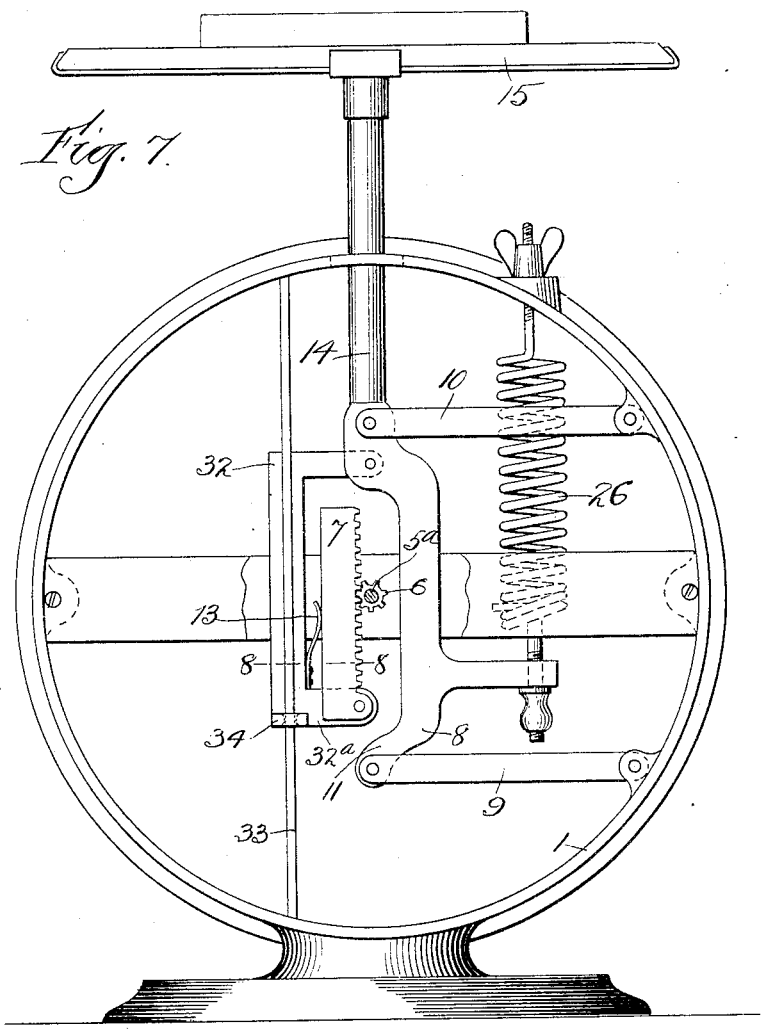
Figure 8:
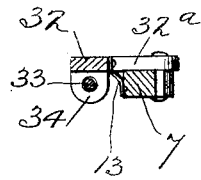

In the said drawings, Figure 1 is a face view of my improved scale, showing the improved dial. Fig. 2 is a vertical sectional view on a smaller scale, taken on the line 2 2, Fig. 3. Fig. 3 is a transverse sectional view taken on the line 3 3, Fig. 2. Fig. 4 is a detail view hereinafter described. Fig. 5 is an enlarged transverse sectional view taken on the line 5 5, Fig. 2. Fig. 6 is a plan view of the hanging hook or ring hereinafter described. Fig. 7 is a view similar to Fig. 2, showing a modification hereinafter described; and Fig. 8 is a detail section on the line 8 8, Fig. 7.

1 is the casing or box, of cylindrical or other suitable form, supported upon a pedestal 2 and having on one side thereof the dial 3, which is usually presented toward the merchant and at the center of which dial is pivoted the double pointer or index, having the two arms or pointers 4 5. The outer edge of the dial 3 is divided into graduations representing weight. In the example shown in the drawings the weight is indicated from one to twenty pounds. The inner part of the dial is divided into radial columns containing numerals representing the product of the weight of a given purchase multiplied by the price per pound, which price is indicated on the pointers 4 5 by numerals, as shown, which are so arranged as to coincide, respectively, with the concentric rows of figures representing the product of the weight multiplied by the price.

The arbor $5^a$ of the pointer is provided with a pinion 6, with which engages a vertically-arranged rack-bar 7. This rack-bar is secured to a yoke 8, which is supported by a pair of parallel arms 9 10, pivoted at their outer ends to the casing 1 and at their inner ends to the yoke 8, the latter at its lower end being provided with an extension 11, which carries the pivot of the arm 9 in line with and under the pivot of the arm 10. The rack-bar 7 is pivoted by means of a pin 12 to an extension $8^a$ on the yoke 8, so that notwithstanding the curved movement of the yoke the rack-bar 7 will remain permanently in contact with the pinion 6 as the yoke rises and falls. To guard against the possibility of the disengagement of the yoke and pinion, a simple spring 13 is secured at one end to the yoke 8 and by means of its other holds the rack-bar 7 normally against the pinion. Upon the upper end of yoke 8 is supported a stem 14, which carries the platform or pan 15, and in order that this stem may be readily removed when it is desired to convert the scale into a swinging scale I attach such stem to the yoke 8 by some suitable detachable connection, such as a screw-stud 15 on the yoke, which engages in a threaded socket in the end of the stem 14, as shown in Fig. 2. Thus when it is desired the platform 15 and its stem may be withdrawn and the scale may be suspended by means of a ring 16, swiveled at 17 to a yoke 18, pivoted to ears or lugs 19, formed on the upper side of the casing 1, such yoke 18 straddling the opening in the casing, through which the stem 14 passes, and when not in use lying flat upon the casing in the manner shown in Figs. 1 and 2.

In order that the pan (not shown) may be attached to the yoke 8 for actuating the pointer or index, when it is desired to convert the scale into a swinging scale I provide the lower end of such yoke 8 with an extensible hook 20, which is capable of being drawn downwardly through a bottom opening 21 in the lower side of the casing 1. This opening 21 when the scale is used as a counter-scale or pedestal-scale is closed by the pedestal 2 and forms means for the attachment of such pedestal, the pedestal being provided with a threaded boss 22, which is screwed into the opening 21, which is also threaded. The hook 20 is formed on the lower end of a channel-iron 23, which, as more clearly shown in Figs. 2 and 5, embraces the smooth edge of the rack-bar 7, and is provided on each side with a vertical longitudinal slot 24, which straddles the pivot-pin 12, and thus permits the hook 20 to be shoved up out of the way in the manner shown in Fig. 2, while at the same time allowing it to be withdrawn downwardly through the opening 21 until the upper end of the slot 24 reaches the pivot-pin 12, which then constitutes a support for the hook 20 as well as a pivot for the rack-bar 7. The spring 13 is utilized for the twofold function of holding the rack-bar 7 against the pinion 6 and also preventing the channel-bar 23 from accidentally slipping downward, the back of the channel-bar 23 being provided with one or more notches 25, into which the end of the spring 13 engages.

26 is the spring which supports the scale pan or platform and which is secured at its upper end to the top of the casing 1 and at its lower end to an extension 27 on the extension 11.

28 29 are horizontal bars secured to the casing 1 and provided for the purpose of supporting the arbor 5ª.

The internal mechanism of the scale thus described is capable of imparting more than a complete rotation to the hand or pointer, and in order that the scale may be utilized for weighing amounts heavier than the weight indicated on the dial I provide the yoke 8 or some other moving part of the internal mechanism with a plate or arm 30, which is secured at its upper end to the yoke 8 and then bent outwardly so as to come into close proximity to the inner face of the dial, as more clearly shown in Fig. 3, and upon this plate 30 I indicate, preferably, the highest numeral indicating weight on the dial 3, which number on the plate 30 is exposed to view through an aperture 31, formed in the dial 3, the numeral on the plate 30 being so arranged that it will come into view through the opening 31 as soon as the pointer has rotated sufficiently far to pass the highest number indicating weight on the dial. The purpose of this arrangement is to indicate to the merchant when the hand or pointer has made one complete revolution, so that he will thereafter know that the number to which the hand points must be added to the highest number indicating weight on the dial. For instance, with the parts in the position indicated in Fig. 1, it will be understood that the hand has made one complete rotation because the numeral "20" appears through the opening 31, and inasmuch as the hand points to four pounds it is ascertained that twenty-four pounds are being weighed.

In order that the numeral "20," which indicates the highest weight on the dial in the example shown in the drawings, may continually appear through the opening 31 as long as the hand continues to move beyond twenty pounds, I repeat the number "20" on the plate 30 a sufficient number of times and at sufficiently short intervals to at all times have at least one of the numbers opposite the opening 31 after the pointer has reached the described position. These numbers "20" on the plate 30 are also arranged in a line concentric with the arc described by the plate 30, as will be understood.

It is of course understood that the casing may be provided with a dial on each side, the dial 3ª, however, being an ordinary dial having numerals indicating weight, or a duplicate of the dial 3, if desired; and the arbor 5ª extends entirely through both dials and is provided with a pointer 4ª, which, if the dial 3ª be an ordinary plain dial, need not be a double pointer, like the pointer 4 5.

In the preferred form of my invention (shown in Fig. 7) I have compounded the yoke 8, which carries the rack-bar 7, for operating the index-pinion 6. The object of this is to have the rack-bar rise and fall strictly in line with its engaging edge and not in an arc, as in the other form, so that it will not climb over the pinion without rotating it when rising nor walk around the under side of the pinion without rotating it when descending, because this varying inclination of the rack while rising and falling would cause the pinion to rotate at different rates of speed throughout a single stroke of the rack of uniform speed, and hence would cause the scale to weigh inaccurately. Therefore, to the upper end of the yoke 8 I pivot the upper end of a second yoke 32, which is provided at its lower end with an extension 32ª, to which the rack-bar 7 is pivoted, and in order that the pivotal point of the rack-bar 7 may rise and fall in a strictly straight line, notwithstanding the curved movement of the yoke 8, I provide the lower end of the yoke 32 with a vertical guide which may consist of an upright rod 33, secured at its upper and lower ends to the casing 1 and passing through a perforated flange 34, formed on the lower end of the yoke 32, the perforation being of such size and form as to permit the upper end of the yoke 32 to oscillate in conformity with the movement of the arms 9 10. The spring 13 may be secured to the yoke 32 and bear against the back of the bar 7, as in the other form.

Having thus described my invention, what I claim as new, and desire to secure by Letters Patent, is—

1. The combination with means for supporting a substance to be weighed and pivoted cushioned arms supporting said means, of an index, a pinion for operating said index, a rack-bar held in engagement with said pinion, means for confining the movement of said rack-bar to a straight line, and an operative connection between said rack-bar and arms for conveying the curvilinear motion of the arms to said rectilinearly-reciprocating rack-bar, substantially as set forth.

2. A scale having in combination a casing provided with a dial and a bottom opening, an index or pointer having a pinion, a cushioned rack-bar engaging with said pinion, and an extensible hook supported and moving in unison with said rack-bar and being arranged over said bottom opening, substantially as set forth.

3. A scale having in combination a casing provided with a bottom opening and a dial, a pointer or index having a pinion, a yoke cushioned against downward movement, a rack-bar secured to said yoke and engaging said pinion, a pan-supporting hook arranged over said bottom opening and having a sliding bar supported by said yoke, and means for holding said sliding bar in its upper position, substantially as set forth.

4. A scale having in combination a casing provided with a bottom opening and a dial, an index having a pinion, a yoke cushioned against downward movement, a rack-bar engaging said pinion and being supported on said yoke, a pivot-pin carried by said yoke, and a slotted bar straddling said pivot-pin and having a pan-supporting hook arranged over said bottom opening whereby said hook may be pulled downward independently of said rack-bar, substantially as set forth.

5. A scale having in combination a casing having a bottom opening and a dial, an index provided with a pinion, a yoke cushioned against downward movement, a rack-bar pivoted to said yoke and engaging said pinion, a channel-iron embracing said rack-bar and having a slot straddling the pivot of said rack-bar and being provided with a hook for supporting a pan, and means for holding said rack-bar in engagement with said pinion and preventing said channel-iron from slipping downward whereby said hook may be pulled downward independently of said rack-bar, substantially as set forth.

6. A scale having in combination a casing provided with a bottom opening and a dial, an index having a pinion, a yoke cushioned against downward movement, a rack-bar pivoted to said yoke and engaging said pinion, a channel-iron embracing said rack-bar and having a slot straddling the pivot of said rack-bar and being provided with a hook located over said bottom opening, and a spring secured to said yoke and bearing against the back of said rack-bar, substantially as set forth.

7. A scale having in combination a casing provided with a bottom opening and a dial, an index, a scale-pan, means in said casing for imparting the movement of said pan to said index, a stem detachably secured to said means and supporting said pan, a hook attached to said means and being located over said bottom opening, and a suspended yoke having its ends pivoted on opposite sides of and straddling said stem, substantially as set forth.

8. A scale having in combination a casing provided with a dial having an opening therethrough, a rotary index, pivoted arms carrying means for actuating said index, and a plate secured to said means back of said dial and bearing a curved column of duplicated numerals extending across said opening to be read in relation to the graduations on said dial, substantially as set forth.

9. A scale having in combination a pinion for operating the index, a rack-bar engaging said pinion, means for confining the movement of said rack-bar to a straight line and a cushioned support for the scale-pan pivotally connected with said rack-bar and moving in the arc of a circle, substantially as set forth.

10. A scale having in combination a pinion for operating the index, a rack-bar engaging said pinion, the scale-pan, pivoted arms for supporting said pan, a yoke having pivotal connection at one end with said arms and being pivotally connected at its other end with said rack-bar, and a guide for confining the movement of the latter end of said yoke to a straight line, substantially as set forth.

11. A scale having in combination a stem for supporting the scale-pan, cushioned pivoted arms for supporting said stem, the yoke 32 pivoted at its upper end to a part of the stem and having a perforated flange at its lower end, a vertical guide-rod passing through said flange, a pinion for operating the index, and the rack-bar pivoted to the lower end of said yoke 32 and engaging said pinion, substantially as set forth.

E. N. GILFILLAN.

Witnesses:
F. A. HOPKINS,
EDNA B. JOHNSON.